United States Patent
Kim et al.

(10) Patent No.: US 10,757,430 B2
(45) Date of Patent: Aug. 25, 2020

(54) METHOD OF OPERATING DECODER USING MULTIPLE CHANNELS TO REDUCE MEMORY USAGE AND METHOD OF OPERATING APPLICATION PROCESSOR INCLUDING THE DECODER

(71) Applicant: SAMSUNG ELECTRONICS CO., LTD., Suwon-si, Gyeonggi-do (KR)

(72) Inventors: Tae Hwan Kim, Hwaseong-si (KR); Sung Ho Roh, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 181 days.

(21) Appl. No.: 15/361,869

(22) Filed: Nov. 28, 2016

(65) Prior Publication Data

US 2017/0171553 A1 Jun. 15, 2017

(30) Foreign Application Priority Data

Dec. 10, 2015 (KR) ........................ 10-2015-0176318

(51) Int. Cl.
*H04N 19/426* (2014.01)
*H04N 19/159* (2014.01)
*H04N 19/172* (2014.01)
*H04N 19/423* (2014.01)
*H04N 19/127* (2014.01)
*H04N 19/593* (2014.01)

(52) U.S. Cl.
CPC ......... *H04N 19/427* (2014.11); *H04N 19/127* (2014.11); *H04N 19/159* (2014.11); *H04N 19/172* (2014.11); *H04N 19/423* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 5,668,599 A * | 9/1997 | Cheney | H04N 5/4401 348/E5.108 |
| 5,909,224 A | 6/1999 | Fung | |
| 6,678,331 B1 | 1/2004 | Moutin et al. | |
| 6,862,325 B2 | 3/2005 | Gay-Bellile et al. | |
| 7,050,496 B2 | 5/2006 | Oh et al. | |
| 7,460,600 B2 | 12/2008 | Seo et al. | |

(Continued)

OTHER PUBLICATIONS

Anderson et al., "A Comparison of Shared and Nonshared Memory Models of Parallel Computation," Proceedings of the IEEE, vol. 79, No. 4, Apr. 1991.*

(Continued)

*Primary Examiner* — Michael J Hess
(74) *Attorney, Agent, or Firm* — F. Chau & Associates, LLC

(57) ABSTRACT

A method of decoding image data includes operating a decoder including a decoding buffer and a decoding module, wherein the decoding module includes a plurality of decoding channels, setting a non-shared memory region and a shared memory region in the decoding buffer, restoring a plurality of frames by decoding a bitstream using the plurality of decoding channels, determining a type of each of the frames, and writing each frame to one of the non-shared memory region or the shared memory region based on the type of each frame.

17 Claims, 11 Drawing Sheets

(56) References Cited

U.S. PATENT DOCUMENTS

| | | |
|---|---|---|
| 7,983,342 B2 | 7/2011 | Saha et al. |
| 8,971,406 B2 | 3/2015 | Wahadaniah et al. |
| 2004/0264924 A1* | 12/2004 | Campisano ............ H04N 5/783 386/346 |
| 2008/0152014 A1* | 6/2008 | Schreier ............... H04N 19/172 375/240.21 |
| 2008/0276220 A1* | 11/2008 | Munshi .................. G06F 8/314 717/119 |
| 2013/0104182 A1* | 4/2013 | Zhang ............... H04N 21/4344 725/127 |
| 2014/0016702 A1* | 1/2014 | Naing ............. H04N 19/00587 375/240.16 |
| 2014/0028797 A1 | 1/2014 | Hattori et al. |
| 2014/0085418 A1 | 3/2014 | Takahashi et al. |
| 2015/0030074 A1 | 1/2015 | Nakagami et al. |

OTHER PUBLICATIONS

Anderson et al., "A Comparison of Shared and Nonshared Memory Models of Parallel Computation," Apr. 1991.*

* cited by examiner

METHOD OF OPERATING DECODER USING MULTIPLE CHANNELS TO REDUCE MEMORY USAGE AND METHOD OF OPERATING APPLICATION PROCESSOR INCLUDING THE DECODER

CROSS-REFERENCE TO RELATED APPLICATIONS

This application claims priority under 35 U.S.C. § 119 to Korean Patent Application No. 10-2015-0176318 filed on Dec. 10, 2015, the disclosure of which is incorporated by reference herein in its entirety.

TECHNICAL FIELD

Exemplary embodiments of the present inventive concept relate to a method of operating a decoder and a method of operating an application processor including the decoder, and more particularly, to a method of operating a decoder using multiple channels and a method of operating an application processor including the decoder.

DISCUSSION OF THE RELATED ART

International standardization of video coding has been led by the Moving Picture Experts Group (MPEG) under the International Organization for Standardization/International Electro-technical Commission (ISO/IEC) and the Video Coding Experts Group (VCEG) under the International Telecommunications Union Telecommunication Standardization sector (ITU-T). MPEG and VCEG organized the Joint Video Team (JVT) and completed the international video coding standard, e.g., H.264/Advanced Video Coding (AVC). Unlike existing video codecs such as MPEG-2, MPEG-4, H.261, and H.263, H.264/ACV has introduced variable block size motion estimation, 1/4-pixel motion vector resolution, multiple reference picture motion estimation, and so on, thereby providing excellent compression capability as compared to existing codec.

An application processor (AP) used in smart phones has been developed to support a plurality of video codecs, and a decoder included in the AP has been able to perform decoding in a time-sharing mode using at least one decoding channel. When performing decoding in the time-sharing mode using at least one decoding channel, the decoder allocates a buffer for each decoding channel, which requires a large capacity of memory.

SUMMARY

According to an exemplary embodiment of the present inventive concept, a method of decoding image data includes operating a decoder including a decoding buffer and a decoding module, wherein the decoding module includes a plurality of decoding channels, setting a non-shared memory region and a shared memory region in the decoding buffer, restoring a plurality of frames by decoding a bitstream using the plurality of decoding channels, determining a type of each of the frames, and writing each frame to one of the non-shared memory region or the shared memory region based on the type of each frame.

According to an exemplary embodiment of the present inventive concept, a method of operating an application processor performed by a decoder includes setting each of unit buffers comprised in a decoding buffer as either of a non-shared buffer and a shared buffer, receiving a bitstream, restoring a plurality of frames by decoding the bitstream using a plurality of decoding channels, determining a type of each of the frames, and writing each frame to one of a plurality of non-shared buffers and a plurality of shared buffers based on the type of each frame. The non-shared buffers are not shared between the decoding channels and the shared buffers are shared between the decoding channels.

According to an exemplary embodiment of the present inventive concept, a method of decoding image data includes operating a decoder including a decoding buffer and a decoding module. The decoding module includes a plurality of decoding channels. The method further includes setting a non-shared memory region and a shared memory region in the decoding buffer. The non-shared memory region includes a plurality of non-shared buffers and the shared memory region includes a plurality of shared buffers. The method also includes restoring a plurality of frames by decoding a bitstream, determining a type of each of the frames, and writing each frame to one of the non-shared buffers or shared buffers based on type of each frame through a decoding channel. The non-shared buffers are accessible by an assigned decoding channel, and the shared buffers are accessible by all decoding channels.

BRIEF DESCRIPTION OF THE DRAWINGS

The above and other features of the inventive concept will become more apparent by describing in detail exemplary embodiments of the present inventive concept thereof with reference to the accompanying drawings, in which.

DETAILED DESCRIPTION OF THE EMBODIMENTS

Exemplary embodiments of the present inventive concept will now be described in more detail hereinafter with reference to the accompanying drawings, in which exemplary embodiments of the present inventive concept are shown. This inventive concept may have many different forms of exemplary embodiments and should not be construed as limited to the exemplary embodiments set forth herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the term "codec" refers to a hardware or software component which performs either or both of encoding and decoding on a data stream or signal or to an algorithm for the hardware or software component. In the field of telecommunication, the codec refers to a digital transceiver and is a portmanteau of coder-decoder. A codec includes software for compressing data using a data compression function or a device and software which converts data such as sound and video from one format into another. Generally, codec refers to a technique of compressing media information such as images and sound.

As used herein, the term "current frame" may refer to a frame including a current block and the term "previous frame" may refer to a frame on which image processing has been performed before or right before image processing is performed on the current frame.

Figure 1:
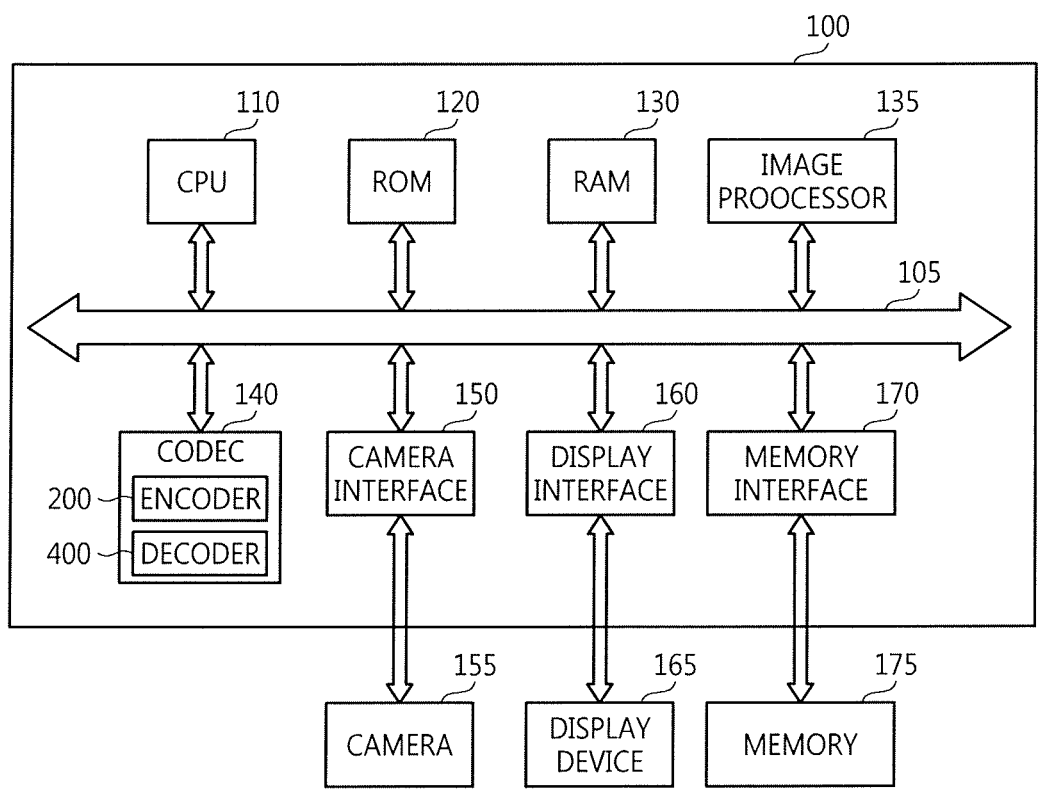
FIG. 1 is a block diagram of a data processing system according to exemplary embodiments of the present inventive concept.

FIG. 1 is a block diagram of a data processing system 10 according to exemplary embodiments of the present inventive concept. The data processing system 10 may be implemented as a mobile terminal such as a smart phone, a tablet personal computer (PC), a personal digital assistant (PDA), an enterprise digital assistant (EDA), a mobile internet device (MID), a video camcorder, an e-book, etc. The data processing system 10 may include an application processor 100, a camera 155, a display device 165, and a memory 175.

The application processor 100 may include a central processing unit (CPU) 110, a read-only memory (ROM) 120, a random access memory (RAM) 130, an image processor 135, a codec 140, a camera interface 150, a display interface 160, and a memory interface 170. The application processor 100 may be implemented as a system on chip (SoC). The elements 110, 120, 130, 135, 140, 150, 160, and 170 of the application processor 100 may communicate data with one another through a bus 105.

The CPU 110 may control the overall operation of the application processor 100. For instance, the CPU 110 may process or execute programs and/or data stored in the ROM 120 and/or the RAM 130. The CPU 110 may be a single computing component, e.g., a multi-core processor with two or more independent processors (or cores).

The ROM 120 may store permanent programs and/or data. The ROM 120 may be implemented as erasable programmable ROM (EPROM) or electrically erasable programmable ROM (EEPROM).

The RAM 130 may temporarily store programs, data, and/or instructions. The RAM 130 may be implemented as dynamic RAM (DRAM) or static RAM (SRAM). The RAM 130 may temporarily store data input/output through the interfaces 150, 160, and 170, or data generated by the codec 140 or the CPU 110.

The image processor 135 may perform image processing on data received from the RAM 130, the camera interface 150, or the memory interface 170 and may output the processed data to the RAM 130, the display interface 160, or the memory interface 170.

The codec 140 may encode or decode data stored in the memory 120 or 130, data received from the camera 155, or data output to the display device 165. The codec 140 may include an encoder 200 and a decoder 400. In an exemplary embodiment of the present inventive concept, the codec 140 may include at least two encoders 200 and at least two decoders 400.

Further, the codec 140 is separate from the CPU 110, the camera interface 150, and/or the display interface 160 in the exemplary embodiment of the present inventive concept illustrated in FIG. 1. In an exemplary embodiment of the present inventive concept the codec 140 may be included in the CPU 110, the camera interface 150, and/or the display interface 160. It will not be construed that the scope of the exemplary embodiments of the present inventive concept is limited by the disposition of the codec 140. The codec 140 may be formed in software, hardware, or a combination thereof.

The camera interface 150 may interface data (e.g., image data) input from the camera 155 external to the application processor 100. The camera 155 may generate data corresponding to an image taken by using a plurality of photosensitive elements.

The display interface 160 may interface data (e.g., image data) output to the display device 165 external to the application processor 100. The display device 165 may output image or video data using a display, which may be a liquid crystal display (LCD) or an active matrix organic light emitting diode (AMOLED) display.

The memory interface 170 may interface data received from the memory 175 external to the application processor 100 or data output to the memory 175. The memory 175 may be formed of non-volatile memory such as flash memory or resistive memory.

Figure 2:
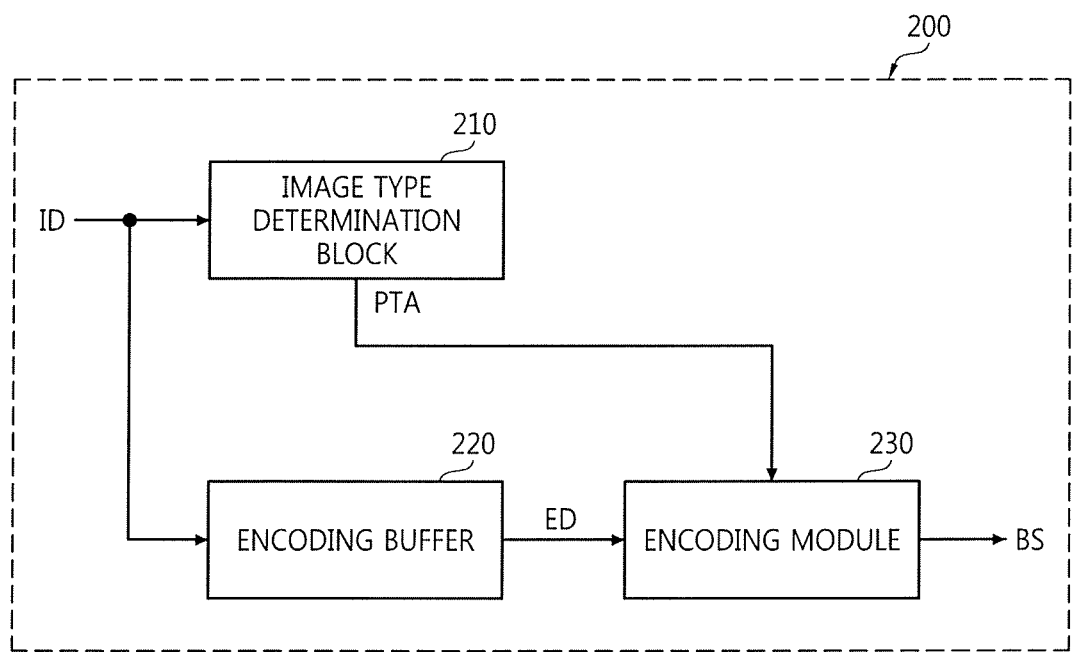
FIG. 2 is a block diagram of an encoder illustrated in FIG. 1 according to an exemplary embodiment of the present inventive concept.

FIG. 2 is a detailed block diagram of the encoder 200 illustrated in FIG. 1 according to an exemplary embodiment of the present inventive concept. Referring to FIGS. 1 and 2, the encoder 200 may include an image type determination block 210, an encoding buffer 220, and an encoding module 230.

The encoding buffer 220 may temporarily store image data ID and may output encoding data ED in encoding order determined according to the control of the image type determination block 210 to the encoding module 230. The size of the encoding buffer 220 may be determined by a method of the image type determination block 210 assigning an image group. For instance, when an IBBP pattern (I-frame, B-frame, B-frame, and P-frame in sequence) is used in the encoder 200 using a single channel, the size of the encoding buffer 220 may be large enough to store four frames. The encoding buffer 220 may be formed outside the codec 140 in other exemplary embodiments of the present inventive concept. For instance, the encoding buffer 220 may be implemented as part of the RAM 130.

The image type determination block 210 may receive the image data ID and may determine an image type of each frame in the image data ID. The image type is a type of image where each frame is encoded in a different manner by the encoding module 230 according to the type of image. The image type may be divided into an intra (I) frame, a predicted (P) frame, or a bidirectional (B) frame.

The I-frame may be an image type referring to the fact that coding is performed using only intra prediction within a current image without involving any other images. The P-frame may be an image type referring to the fact that coding is performed using both inter prediction referring to a preceding image and intra prediction. The B-frame is an image type referring to the fact that coding is performed using inter prediction based on a preceding image and a succeeding image and intra prediction.

The image type determination block 210 assigns the image data ID to a particular image group to determine the image type of each frame. The size of the image group is determined by the assignment of an I-frame. The structure of the image group is determined by the arrangement of a P-frame and/or a B-frame. In other words, the number of bits in coded data can be reduced by the arrangement of a P-frame and a B-frame, and the size of the image group is restricted by intermittently assigning an I-frame so that error propagation is prevented.

The IBBP pattern may be used to assign the image data to a particular image group. When the IBBP pattern is used, consecutive frames in the image data ID are determined to be I-frame, B-frame, B-frame, and P-images in sequence.

The image type determination block 210 may control a frame output from the encoding buffer 220. In other words, a frame order may be different from an encoding order with respect to the image data ID according to the image group assignment method. For instance, when the image type determination block 210 performs an assignment for the image group using the IBBP pattern, a sequence of frames in the image data ID is IBBP, but the encoding order needs to be IPBB in the encoding module 230. Accordingly, the image type determination block 210 may control the encoding buffer 220 to output the image data ID, which has been stored in the order of IBBP in the encoding buffer 220, in the order of IPBB.

The image type determination block 210 may generate an image type assignment signal PTA indicating an image type of a frame in the encoding image ED and may transmit the image type assignment signal PTA to the encoding module 230. The image type determination block 210 may also transmit the image type assignment signal PTA to the decoder 400 illustrated in FIG. 3.

The encoding module 230 may perform intra prediction and/or inter prediction according to the image type of the encoding data ED based on the image type assignment signal PTA to generate an encoded bitstream BS.

Figure 3:
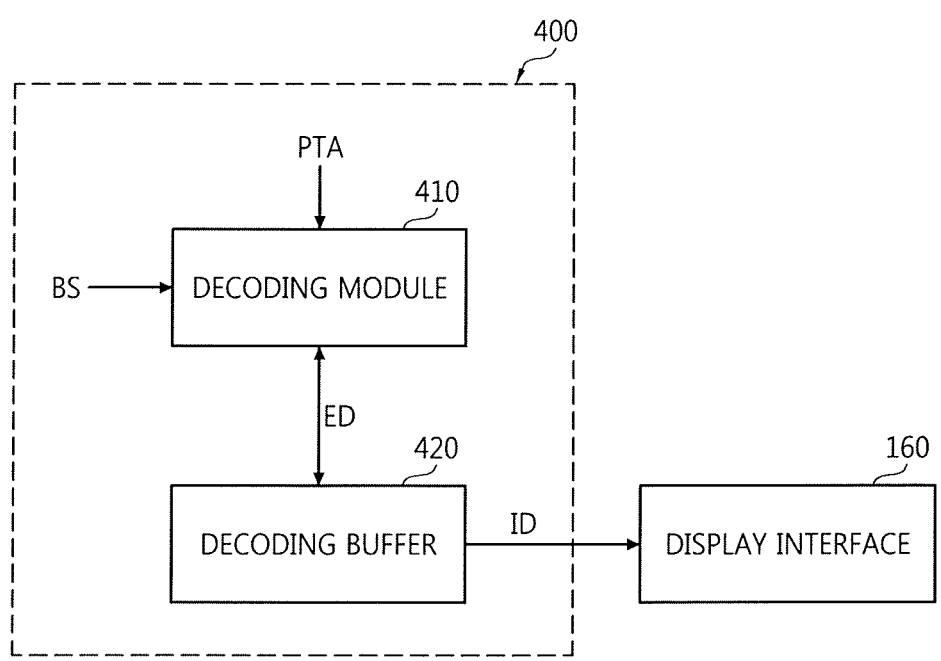
FIG. 3 is a block diagram of a decoder illustrated in FIG. 1 according to an exemplary embodiment of the present inventive concept.

FIG. 3 is a block diagram of the decoder 400 illustrated in FIG. 1 according to an exemplary embodiment of the present inventive concept. Referring to FIGS. 1 through 3, the decoder 400 may include a decoding module 410 and a decoding buffer 420.

The decoding module 410 may receive the bitstream BS from the encoding module 230. The decoding module 410 may also receive the image type assignment signal PTA from the encoder 200. The bitstream BS may be output from the encoding module 230 and stored in memory and then input to the decoding module 410.

The decoding module 410 may decode the bitstream BS to generate the encoding data ED. In other words, the decoding module 410 may perform intra prediction and/or inter prediction based on the image type assignment signal PTA. The decoding module 410 may perform an inverse operation of the encoding module 230 to restore the encoding data ED from the bitstream BS. At this time, an order of sequential frames in the encoding data is the same as an order in which the encoding module 230 encodes frames. The order of the sequential frames in the encoding data ED may be IPBB.

The decoding module 410 may decode the bitstream BS using a plurality of decoding channels DC1 and DC2. For example, the decoding module 410 may decode a first section of the bitstream BS using the first decoding channel DC1 and may decode a next section of the bitstream BS using the second decoding channel DC2. Such operation may be referred to as time sharing.

The decoding module 410 may decode the bitstream BS using each of the decoding channels DC1 and DC2 based on one of a plurality of standards. In other words, one decoding channel corresponds to one standard. For instance, when the standards include an MPEG-2 standard and an MPEG-4 standard, the decoding module 410 may decode the first section of the bitstream BS using the first decoding channel DC1 based on the MPEG-2 standard and may decode the next section of the bitstream BS using the second decoding channel DC2 based on the MPEG-4 standard. Accordingly, even when decoding data that has been encoded according to two different standards (e.g., MPEG-2 and MPEG-4), the decoding module 410 performs decoding in order and transmits the image data ID to the display interface 160.

In an exemplary embodiment of the present inventive concept, the decoding module 410 may retrieve stored codes of an algorithm for performing decoding steps pursuant to a standard (e.g., MPEG-4) from the memory 175 during decoding. The decoding module 410 may store the encoding data ED that has been restored in the decoding buffer 420. For example, the decoding module 410 may write sequential frames in the encoding data ED to the decoding buffer 420. For instance, the decoding module 410 may restore I-, P- and B-frames included in the encoding data ED for each digital channel based on the image type assignment signal PTA and may write the frames to the decoding buffer 420.

The decoding module 410 may set a shared memory region SM and a non-shared memory region UM in the decoding buffer 420. The non-shared memory region UM may be a region with dependence between the decoding channels DC1 and DC2. For instance, an I-frame or a P-frame may be stored in the non-shared memory region UM, The shared memory region SM may be a region without dependence between the decoding channels DC1 and DC2, For instance, a B-frame may be stored in the shared memory region SM. The decoding buffer 420 may be implemented outside the codec 140, for example, as part of the RAM 130 in other exemplary embodiments of the present inventive concept.

The decoding buffer 420 may include a plurality of unit buffers. Each of the unit buffers may store a frame. The decoding buffer 420 may temporarily store frames in the encoding data ED and then rearrange the frames in an order which is determined by the control of the decoding module 410 to restore the image data ID. The decoding buffer 420 may transmit the image data ID that has been restored to the display interface 160. This operation may refer to an operation of the display interface 160 reading sequential frames in the image data ID from the decoding buffer 420. The frame order may be IBBP.

Figure 4:
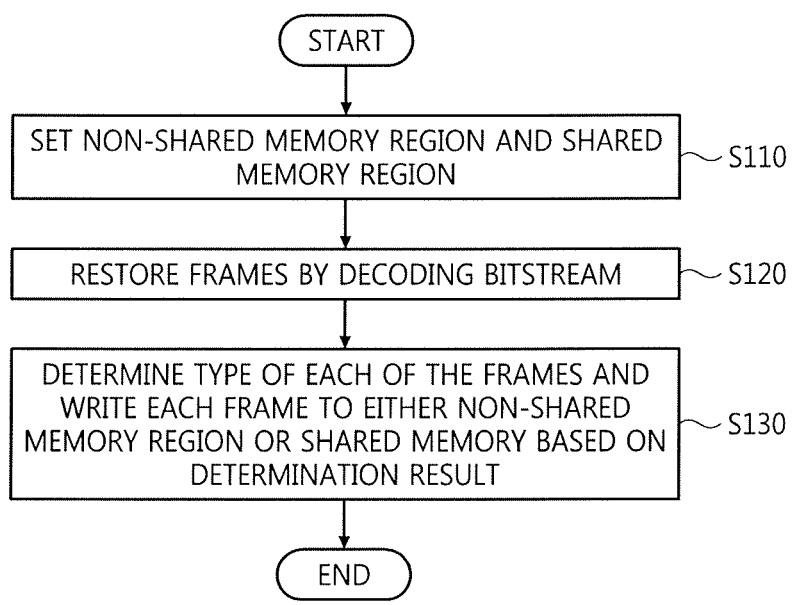
FIG. 4 is a flowchart of a method of decoding for a decoder according to exemplary embodiments of the present inventive concept.

FIG. 4 is a flowchart of a decoding method of the decoder 400 according to exemplary embodiments of the present inventive concept. The decoding module 410 may set the non-shared memory region UM and the shared memory region SM in the decoding buffer 420 in operation S110. The non-shared memory region UM set by the decoding module 410 may include a plurality of non-shared buffers. The shared memory region SM set by the decoding module 410 may include a plurality of shared buffers. A non-shared buffer may have a larger storage size than a shared buffer. In other words, the decoding module 410 may group largest buffers of the same kind in the decoding buffer 420 into the shared memory region SM and may set a region of the decoding buffer 420 as the non-shared memory region UM.

The decoding module 410 may receive and decode the bitstream BS in operation S120. In detail, the decoding module 410 may receive and decode the bitstream BS, thereby restoring a plurality of frames included in the encoding data ED. The order of the frames may be determined during encoding. For instance, when the image type determination block 210 performs assignment for an image group in the IBBP pattern during encoding, the encoding data ED may include frames in order of an I-frame, a P-frame, a B-frame, and a B-frame.

The decoding module 410 may determine a type of each of the frames and may write each frame to either the non-shared memory region UM or the shared memory region SM based on the type of each frame according to operation S130.

Figure 5:
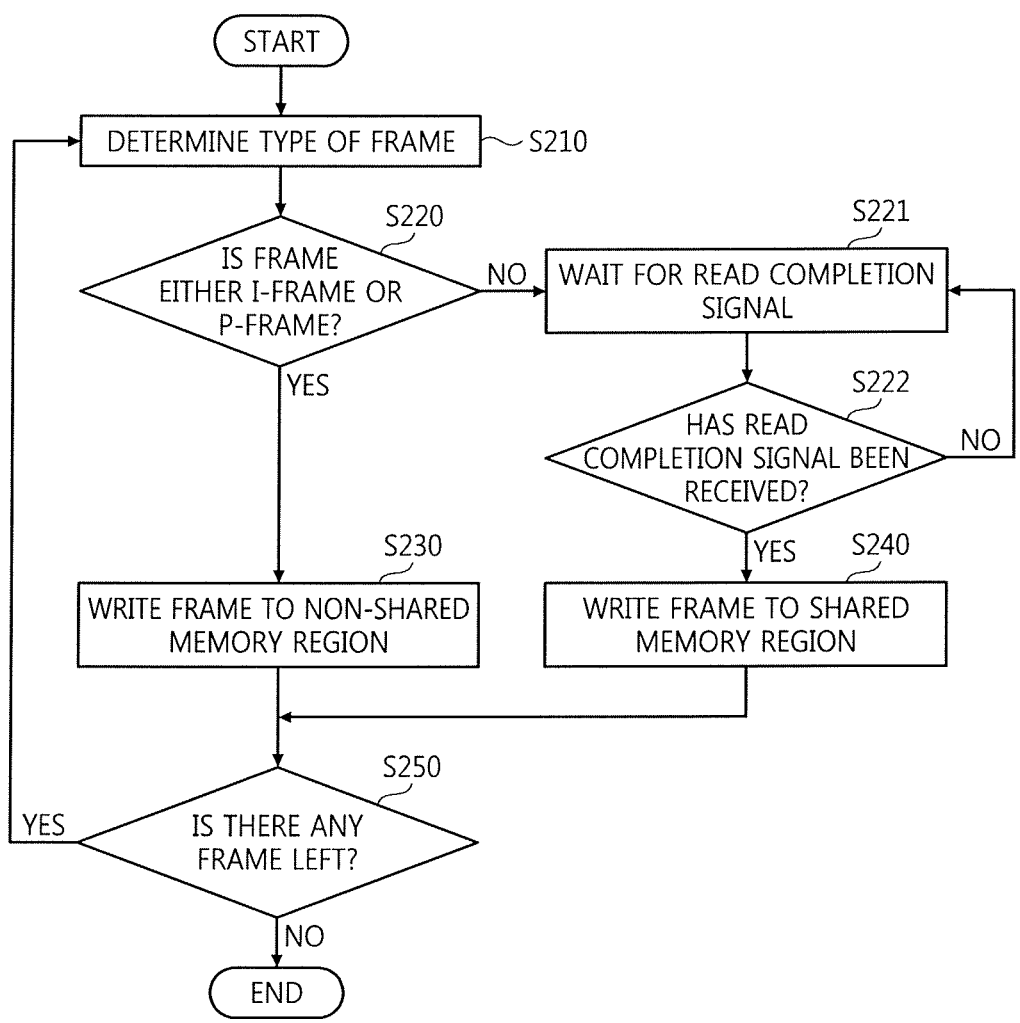
FIG. 5 is a detailed flowchart of an operation of writing a plurality of frames to either a non-shared memory region or a shared memory region in the method illustrated in FIG. 4 according to exemplary embodiments of the present inventive concept.

FIG. 5 is a detailed flowchart of an operation of writing each of the frames to either the non-shared memory region UM or the shared memory region SM in the method illustrated in FIG. 4 according to an exemplary embodiment of the present inventive concept. The decoding module 410 may determine a type of a frame in operation S210. For example, the decoding module 410 may determine the type of the frame based on the image type assignment signal PTA or may directly determine the type of the frame from the encoding data ED that has been restored. The inventive concept is not restricted to the current exemplary embodiments of the present inventive concept.

When the frame is either an I-frame or a P-frame (e.g., in case of YES) in operation S220, the decoding module 410 may write the frame to the non-shared memory region UM in operation S230. When the frame is not either an I-frame or a P-frame (e.g., in case of NO) in operation S220 (e.g., when the frame is a B-frame), the decoding module 410 may wait for a read completion signal in operation S221. For example, the decoding module 410 may receive the read completion signal from the display interface 160.

When the decoding module 410 has received the read completion signal (in case of YES) in operation S222, the decoding module 410 may write the frame to the shared memory region SM in operation S240. When the decoding module 410 has not received the read completion signal (in case of NO) in operation S222, the decoding module 410 may continuously wait for the read completion signal in operation S221.

The decoding module 410 may determine whether there is any frame left in operation S250. When it is determined that there is any frame left (in case of YES) in operation S250, the decoding module 410 may return to the step of determining a type of a frame in operation S210. Consequently, the decoding module 410 may repeat the above-described operation until all frames are stored in the decoding buffer 420.

Figure 6:
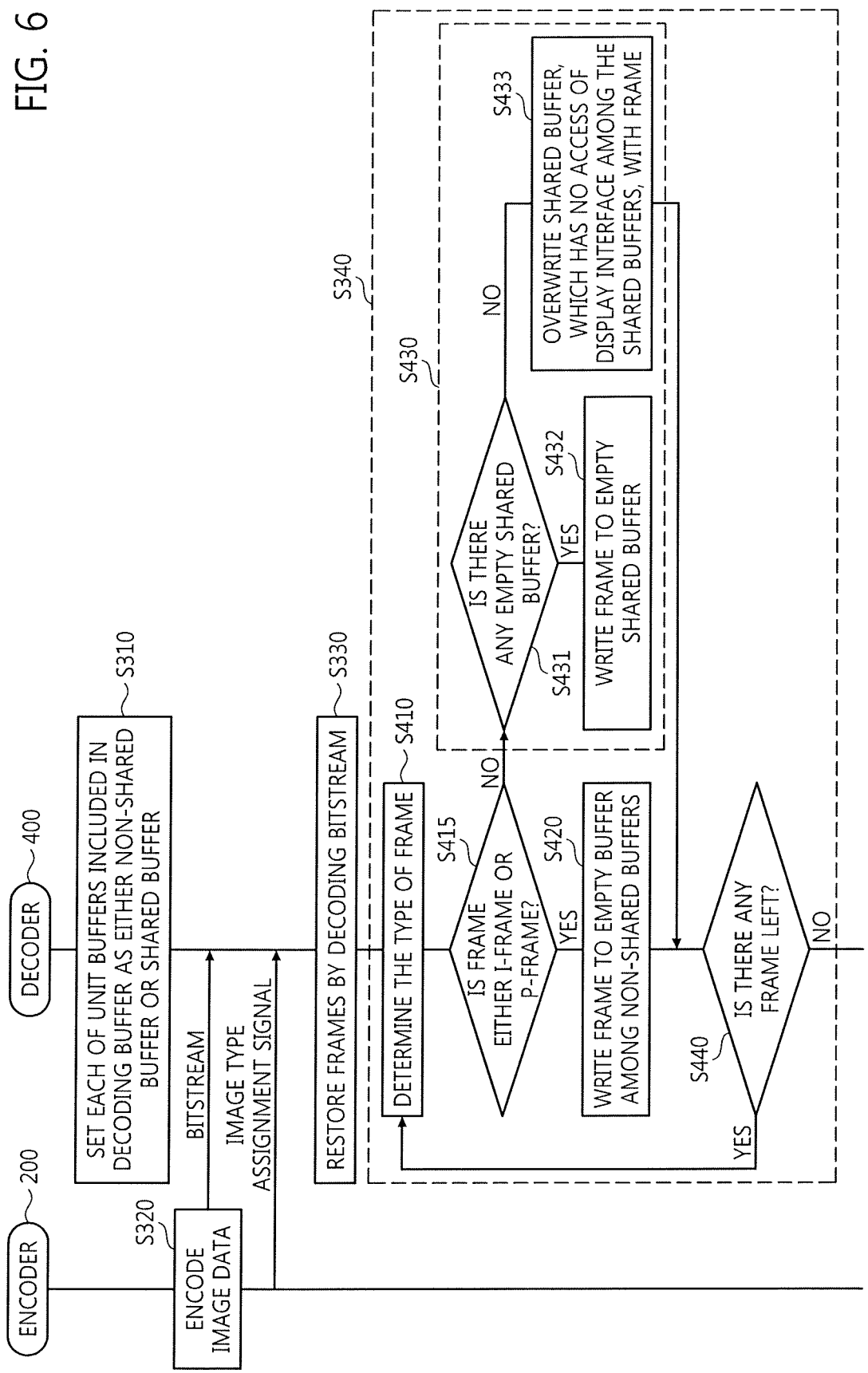
FIG. 6 is a flowchart of a method of operating an application processor according to exemplary embodiments of the present inventive concept.

FIG. 6 is a flowchart of a method of operating the application processor 100 according to exemplary embodiments of the present inventive concept. Referring to FIGS. 1 and 6, the decoder 400 may set each of a plurality of unit buffers included in the decoding buffer 420 as either a non-shared buffer UB or a shared buffer SB in operation S310.

The decoder 400 may receive the bitstream BS from the encoder 200 or the memory interface 170 in operation S320. Although the bitstream BS is directly transmitted from the encoder 200 to the decoder 400 in the exemplary embodiment of the present inventive concept illustrated in FIG. 6, the bitstream BS output from the encoder 200 may be stored in the memory 175. Further, in exemplary embodiments of the present inventive concept, the decoder 400 may receive the bitstream BS from the memory 175 through the memory interface 170. The inventive concept is not restricted to the current exemplary embodiments of the present inventive concept.

The decoder 400 may restore a plurality of frames by decoding the bitstream BS using the decoding channels DC1 and DC2 in operation S330. The decoder 400 may determine a type of each of the frames and may write each frame to one of the non-shared buffers UBs and the shared buffers SBs based on the determination result in operation S340, which will be described in detail below.

After operation S330, the decoder 400 may determine a type of each frame in operation S410. The decoder 400 may determine the type of the frame based on the image type assignment signal PTA received from the encoder 200. When it is determined that the frame is either an I-frame or a P-frame (in case of YES) in operation S415, the decoder 400 may write the frame to an empty one of the non-shared buffers UBs in operation S420. For example, the empty buffer may refer to a buffer in which substantially no data is stored or invalid data is stored from a software point of view.

When it is determined that the frame is a B-frame (in case of NO) in operation S415, the decoder 400 may write the frame to one of the shared buffers SBs in operation S430. In detail, when it is determined that the frame is a B-frame (in case of NO) in operation S415, the decoder 400 may determine whether there is an empty shared buffer among the shared buffers SBs in operation S431. When it is determined that there is an empty shared buffer (in case of YES) in operation S431, the decoder 400 may overwrite a shared buffer, which has no access to the display interface 160 among the shared buffers SBs, with the frame in operation S433. The shared buffer having no access to the display interface 160 may be a buffer from which the display interface 160 does not read a frame. Overwriting may be the same as a normal write operation.

When it is determined that there is any frame left in operation S440, the decoder 400 may return to determining a type of a frame in operation S410.

Figure 7:
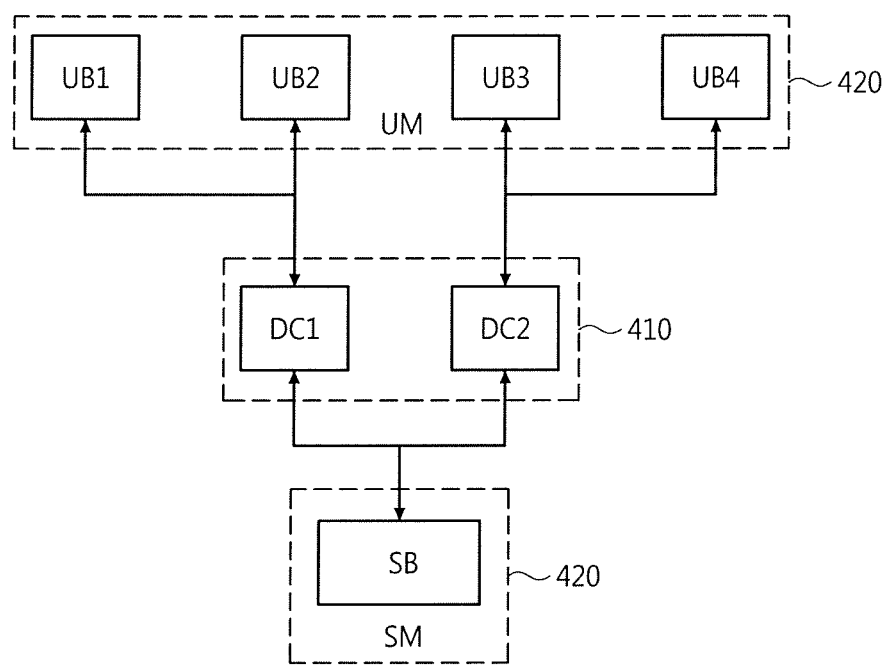
FIG. 7 is a block diagram of the connection between a decoding module and a decoding buffer according to exemplary embodiments of the present inventive concept.

FIG. 7 is a block diagram of the connection between the decoding module 410 and the decoding buffer 420 according to an exemplary embodiment of the present inventive concept. Even though there are two decoding channels DC1 and DC2 in the exemplary embodiments of the present inventive concept illustrated in FIG. 7, the inventive concept is not restricted thereto. For example, other exemplary embodiments may employ more than two channels. For purposes of illustration, two decoding channels DC1 and DC2 are described below.

FIG. 7 shows an access path of the decoding module 410 to each buffer when the decoding module 410 performs decoding using the first and second decoding channels DC1 and DC2. When the decoding module 410 performs decoding using the first decoding channel DC1, the decoding module 410 may access first and second non-shared buffers UB1 and UB2 and a shared buffer SB. When the decoding module 410 performs decoding using the second decoding channel DC2, the decoding module 410 may access third and fourth non-shared buffers UB3 and UB4 and the shared buffer SB.

Referring to FIG. 7, the non-shared memory region UM may include a plurality of the non-shared buffers UB1, UB2, UB3, and UB4. Each of the non-shared buffers UB1 through UB4 may be assigned to one of the decoding channels DC1 and DC2. Accordingly, when the decoding module 410 performs decoding using one of the decoding channels DC1 and DC2, the decoding module 410 can access non-shared buffers only assigned to one of the decoding channels DC1 and DC2 which is currently used. For instance, when the decoding module 410 performs decoding using the first decoding channel DC1, the decoding module 410 can access the first and second non-shared buffers UB1 and UB2 only. When the decoding module 410 performs decoding using the second decoding channel DC2, the decoding module 410 can access the third and fourth non-shared buffers UB3 and UB4 only.

Although two non-shared buffers are assigned to each decoding channel in the exemplary embodiment illustrated in FIG. 7, the present inventive concept is not restricted to the current exemplary embodiments of the present inventive concept. For example, one or at least three non-shared buffers may be assigned to each of the decoding channels DC1 and DC2 in other exemplary embodiments of the present inventive concept.

The shared memory region SM may include the shared buffer SB. The shared buffer SB is not assigned to only one of the channels. Although there is only one shared buffer SB in the exemplary embodiments illustrated in FIG. 7, the present inventive concept is not restricted to the current exemplary embodiments of the present inventive concept. For example, at least two shared buffers may be assigned in other exemplary embodiments of the present inventive concept. The shared buffer SB may be larger than the non-shared buffer UB.

Figure 8:
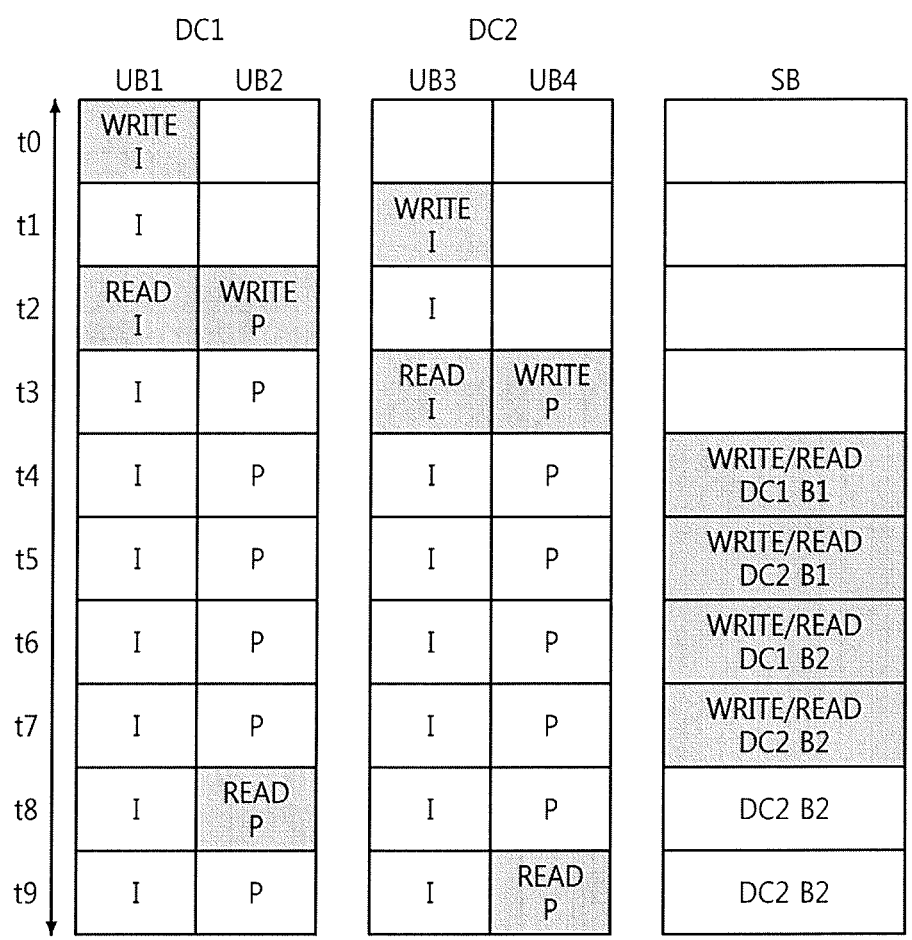
FIG. 8 is a timing chart showing a procedure in which the decoder having the structure illustrated in FIG. 7 performs decoding in a time sharing mode according to exemplary embodiments of the present inventive concept.

FIG. 8 is a timing chart showing a procedure in which the decoder 400 having the structure illustrated in FIG. 7 performs decoding in a time sharing mode according to exemplary embodiments of the present inventive concept. It is assumed that the image type determination block 210 assigns frames to an image group in the IBBP pattern.

Referring to FIG. 8, frames, e.g., an I-frame, a P-frame, and a B-frame are sequentially written to and read from the non-shared buffers UB1 through UB4 and the shared buffer SB through the decoding channels DC1 and DC2 according to time. As described above, the image type determination block 210 included in the encoder 200 may assign frames to an image group in the IBBP pattern and the encoding module 230 may encode the frames in order of a IPBB pattern. Accordingly, encoding data ED may also be written to the decoding buffer 420 in an IPBB order. However, the display interface 160 may read the frames from the decoding buffer 420 in an IBBP order.

In the IPBB assignment, there are two B-frames. Hereinafter, a first B-frame is referred to as a B1 frame and a second B-frame is referred to as a B2 frame, as shown in FIG. 8. As shown in FIG. 8, an order in which the decoder 400 performs decoding using two decoding channels DC1 and DC2 may be I(DC1), I(DC2), P(DC1), P(DC2), B1(DC1), B1(DC2), B2(DC1), and B2(DC2).

The decoding module 410 may decode the bitstream BS at each time point and write each of generated frames to non-shared buffers or a shared buffer. In addition, the display interface 160 may read the frames written to the non-shared buffers or the shared buffer. This operation will be described in detail below.

At a time point t0, the I-frame may be written to the first non-shared buffer UB1 through the first decoding channel DC1. At a time point t1, the I-frame may be written to the third non-shared buffer UB3 through the second decoding channel DC2. At a time point t2, the P-frame may be written to the second non-shared buffer UB2 through the first decoding channel DC1. At substantially the same time, the I-frame that was written to the first non-shared buffer UB1 may be read.

At a time point t3, the P-frame may be written to the fourth non-shared buffer UB4 through the second decoding channel DC2. At substantially the same time, the I-frame that was written to the third non-shared buffer UB3 may be read.

At a time point t4, the B1 frame may be written to the shared buffer SB through the first decoding channel DC1. At substantially the same time, the B1 frame written to the shared buffer SB may be read. In other words, the display interface 160 may read the B1 frame while the decoding module 410 is writing the B1 frame to the shared buffer SB. At a time point t5, the B1 frame may be written to the shared buffer SB through the second decoding channel DC2. At substantially the same time, the B1 frame written to the shared buffer SB may be read.

At a time point t6, the B2 frame may be written to the shared buffer SB through the first decoding channel DC1. At substantially the same time, the B2 frame written to the shared buffer SB may be read. At a time point t7, the B2 frame may be written to the shared buffer SB through the second decoding channel DC2. At substantially the same time, the B2 frame written to the shared buffer SB may be read.

At a time point t8, the P frame that was written to the second non-shared buffer UB2 may be read through the first decoding channel DC1. At a time point t9, the P frame that was written to the fourth non-shared buffer UB4 may be read through the second decoding channel DC2.

As shown in FIG. 8, the decoder 400 performing decoding through the decoding channels DC1 and DC2 may operate in the time sharing mode. In this mode, the decoder uses a shared buffer, thereby reducing memory usage compared to when different buffers are used for respective channels. However, unlike the case shown in FIG. 8, when a frame is written to the shared buffer SB before all of a frame previously written to the shared buffer SB is read, the frame may be damaged. Such phenomenon is called display tearing. The display tearing may occur when a rate at which the decoding module 410 writes the B1 or B2 frame to the shared buffer SB is higher than a rate at which the display interface 160 reads the B1 or B2 frame.

Figure 9:
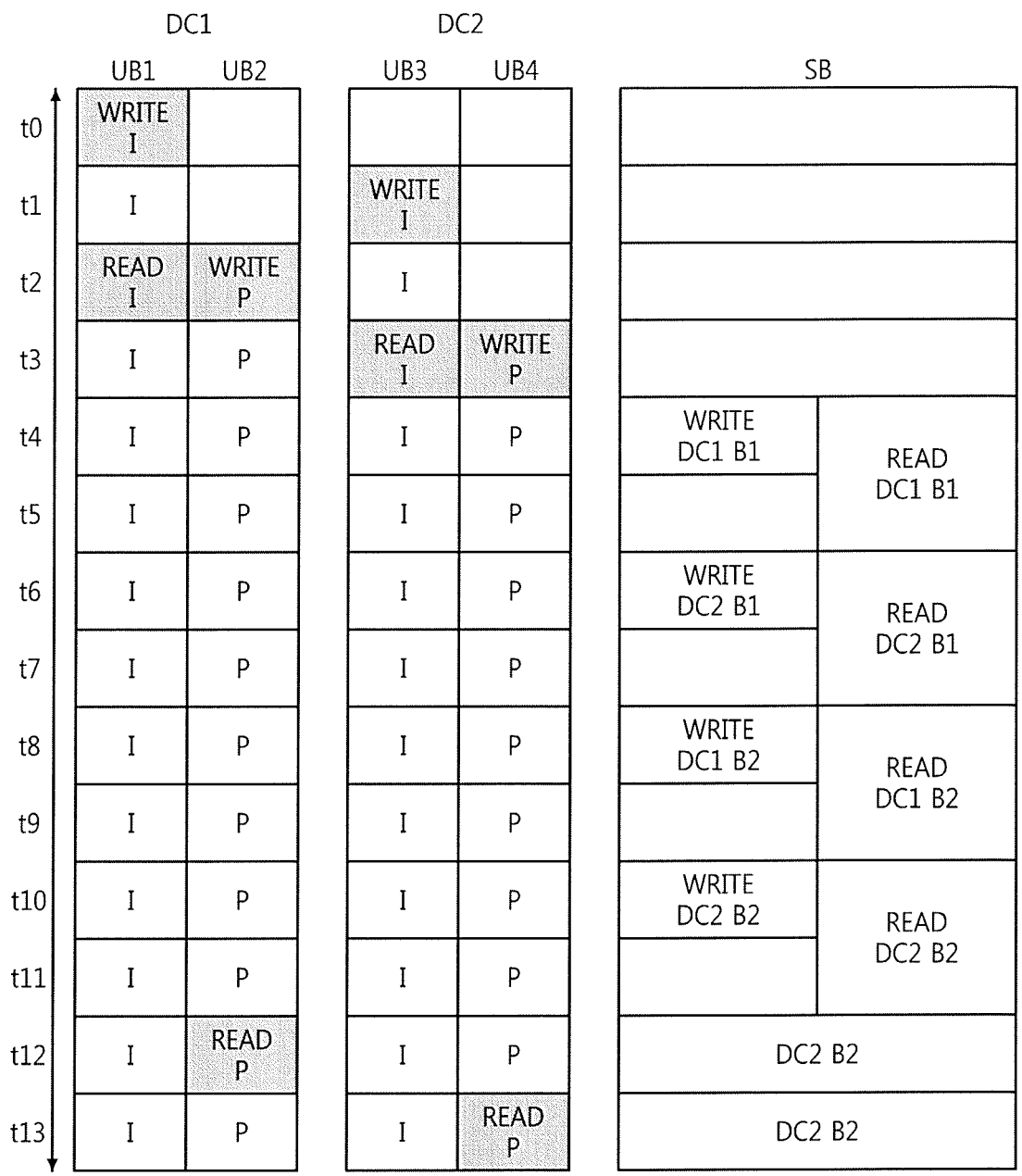
FIG. 9 is a timing chart showing a procedure in which the decoder performs decoding in a time sharing mode according to exemplary embodiments of the present inventive concept.

FIG. 9 is a timing chart showing a procedure in which the decoder 400 performs decoding in a time sharing mode according to exemplary embodiments of the present inventive concept. To avoid redundancy, description will be focused on differences from the exemplary embodiments of the present inventive concept illustrated in FIG. 8.

Referring to FIG. 9, the decoder 400 may secure time for the display interface 160 to read the B1 or B2 frame from the shared buffer SB. In other words, after the display interface 160 reads a frame from the shared buffer SB, the decoding module 410 writes another frame to the shared buffer SB. For this operation, the display interface 160 may send a read completion signal to the decoding module 410. This operation of the decoder 400 may be performed to prevent the display tearing.

At the time point t4, the B1 frame may be written to the shared buffer SB through the first decoding channel DC1. At substantially the same time, the B1 frame that was written to the shared buffer SB may be read. However, since time taken to read the B1 frame is longer than time taken to write the B1 frame, reading the B1 frame may be continued at the time point t5.

At the time point t6, the B1 frame may be written to the shared buffer SB through the second decoding channel DC2. At substantially the same time, the B1 frame that was written to the shared buffer SB may be read. However, since time taken to read the B1 frame is longer than time taken to write the B1 frame, reading the B1 frame may be continued at the time point t7. In the same manner, time for the B2 to be read is secured at time points t8 and t10.

In the current exemplary embodiments of the present inventive concept, display tearing is prevented but implementation of this operation is complicated and a lot of time is required.

Figure 10:
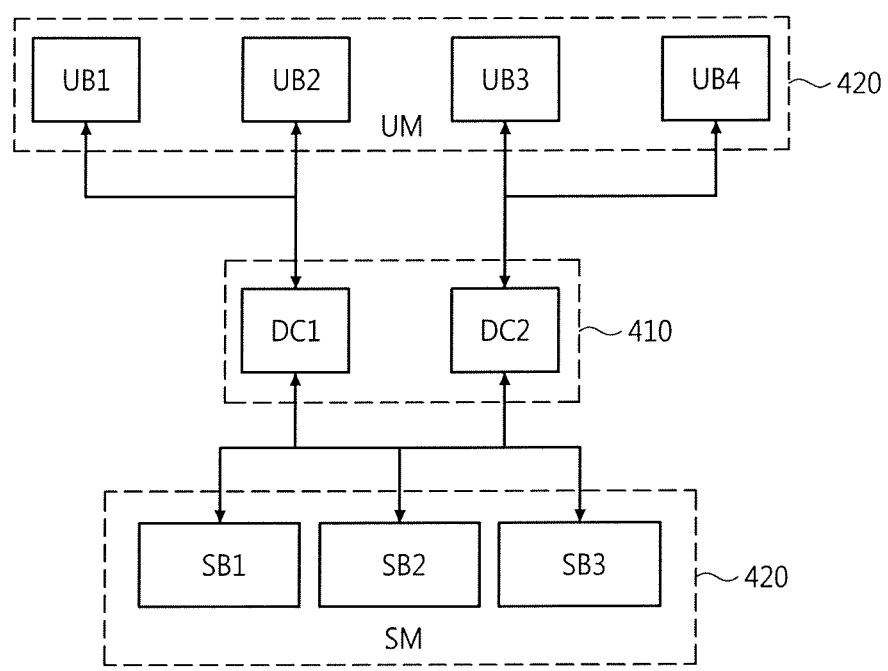
FIG. 10 is a block diagram of the connection between a decoding module and a decoding buffer according to exemplary embodiments of the present inventive concept.

FIG. 10 is a block diagram of the connection between the decoding module 410 and the decoding buffer 420 according to exemplary embodiments of the present inventive concept. To avoid redundancy, differences between the exemplary embodiments illustrated in FIG. 7 and the exemplary embodiments illustrated in FIG. 10 will be described.

Unlike the exemplary embodiments of the present inventive concept illustrated in FIG. 7, the shared memory region SM may include a plurality of shared buffers SB1, SB2, and SB3 in the exemplary embodiments of the present inventive concept illustrated in FIG. 10. The shared buffers SB1, SB2, and SB3 are not assigned to only one of the decoding channels DC1 and DC2. Each of the decoding channels DC1 and DC2 may access each of the shared buffers SB1, SB2, and SB3 in the shared memory region SM. Accordingly, when the decoding module 410 performs decoding on one of the decoding channels DC1 and DC2, the decoding module 410 is able to access each of the shared buffers SB1, SB2, and SB3 through both of the decoding channels DC1 and DC2. The shared buffers SB1, SB2, and SB3 may have a larger storage size than the non-shared buffers UB1 through UB4.

Figure 11:
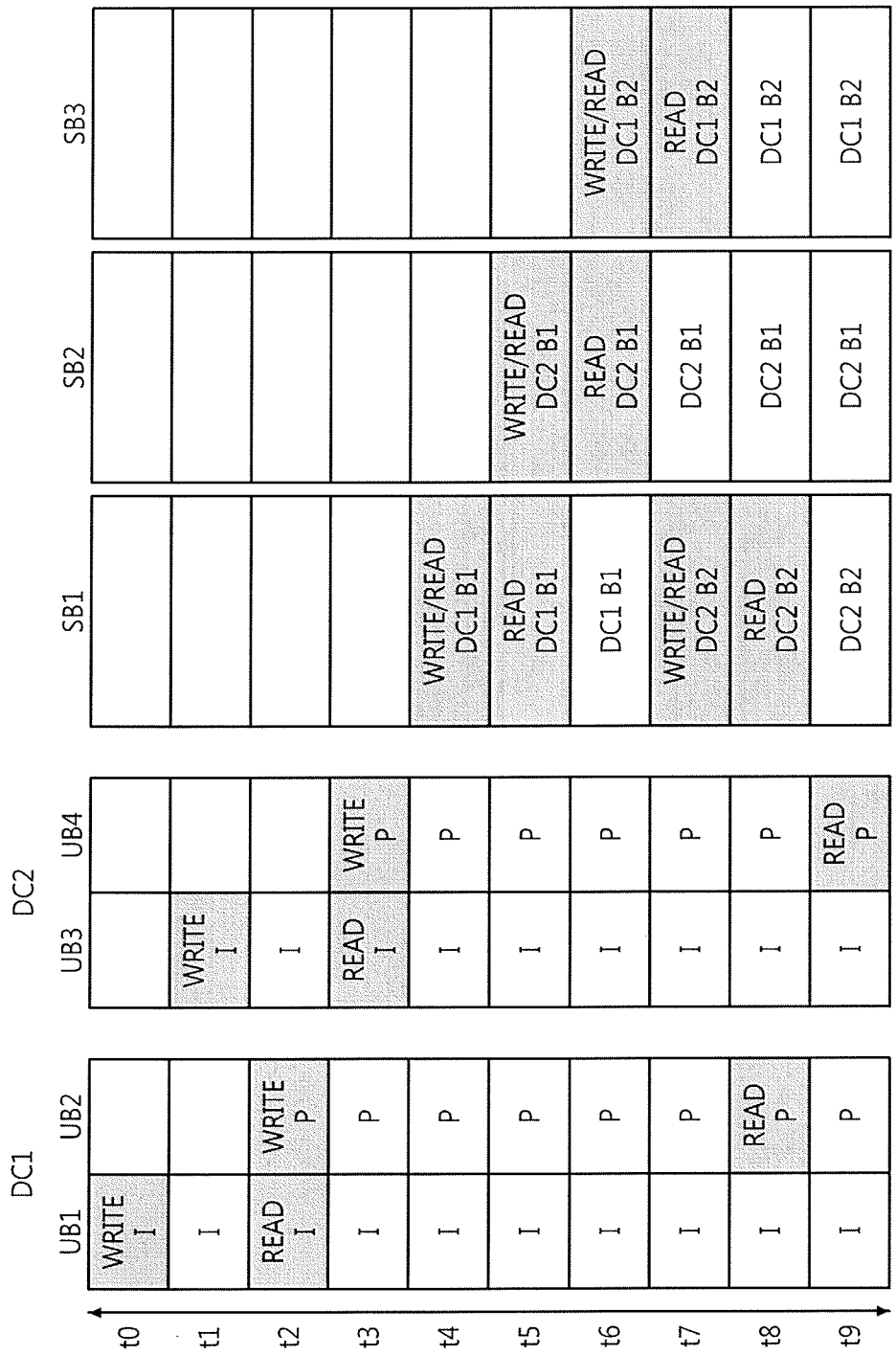
FIG. 11 is a timing chart showing a procedure in which the decoder having the structure illustrated in FIG. 10 performs decoding in a time sharing mode according to exemplary embodiments of the present inventive concept.

FIG. 11 is a timing chart showing a procedure in which the decoder 400 having the structure illustrated in FIG. 10 performs decoding in a time sharing mode according to exemplary embodiments of the present inventive concept. It is assumed that the image type determination block 210 assigns frames in the image data ID to an image group in the IBBP pattern.

Referring to FIG. 11, frames, e.g., an I-frame, a P-frame, and a B-frame are sequentially written to and read from the non-shared buffers UB1 through UB4 and the shared buffers SB1 through SB3 through the decoding channels DC1 and DC2 according to points in time. As described above, the image type determination block 210 included in the encoder 200 may assign frames to an image group in the IBBP pattern, and the encoding module 230 may encode the frames in order of IPBB. Accordingly, the encoding data ED may also be written to the decoding buffer 420 in an IPBB order. However, the display interface may read frames from the decoding buffer 420 in an IBBP order.

In the IPBB assignment, there are two B-frames. Hereinafter, a first B-frame is referred to as a B1 frame and a second B-frame is referred to as a B2 frame, as shown in FIG. 11. As shown in FIG. 11, an order in which the decoder 400 performs decoding using two decoding channels DC1 and DC2 may be I(DC1), I(DC2), P(DC1), P(DC2), B1(DC1), B1(DC2), B2(DC1), and B2(DC2).

The decoding module 410 may decode the bitstream BS at each time point and write each of generated frames to a plurality of non-shared buffers or a plurality of shared buffers. In addition, the display interface 160 may read the frames written to the non-shared buffers or the shared buffers.

Referring to FIG. 11, at the time point t0, the I-frame may be written to the first non-shared buffer UB1 through the first decoding channel DC1. At the time point t1, the I-frame may be written to the third non-shared buffer UB3 through the second decoding channel DC2. At the time point t2, the P-frame may be written to the second non-shared buffer UB2 through the first decoding channel DC1. At substantially the same time, the I-frame that was written to the first non-shared buffer UB1 may be read. At the time point t3, the P-frame may be written to the fourth non-shared buffer UB4 through the second decoding channel DC2. At substantially the same time, the I-frame that was written to the third non-shared buffer UB3 may be read.

At the time point t4, the B1 frame may be written to the first shared buffer SB1 through the first decoding channel DC1. At substantially the same time, the B1 frame written to the first shared buffer SB1 may be read. In other words, the display interface 160 may read the B1 frame while the decoding module 410 is writing the B1 frame to the first shared buffer SB1.

At the time point t5, the B1 frame may be written to the second shared buffer SB2 through the second decoding channel DC2. At substantially the same time, the B1 frame written to the second shared buffer SB2 may be read. At this time, the display interface 160 may read the B1 frame from the first shared buffer SB1 through the first decoding channel DC1. As described above, since the decoding module 410 writes the B1 frame to the second shared buffer SB2 through the second decoding channel DC2, display tearing does not occur.

At the time point t6, the B2 frame may be written to the third shared buffer SB3 through the first decoding channel DC1. At substantially the same time, the B2 frame written to the third shared buffer SB3 may be read. At this time, the display interface 160 may read the B1 frame from the second shared buffer SB2 through the second decoding channel DC2. Accordingly, display tearing does not occur, as described above.

At the time point t7, the B2 frame may be written to the first shared buffer SB1 through the second decoding channel DC2. At substantially the same time, the B2 frame written to the first shared buffer SB1 may be read. At this time, the display interface 160 may read the B2 frame from the third shared buffer SB3 through the first decoding channel DC1. Accordingly, display tearing does not occur, as described above.

At the time point t8, the P frame that was written to the second non-shared buffer UB2 may be read through the first decoding channel DC1. At this time, the display interface 160 may continuously read the B2 frame from the first shared buffer SB1 through the second decoding channel DC2. Accordingly, display tearing does not occur, as described above.

At the time point t9, the P frame that was written to the fourth non-shared buffer UB4 may be read through the second decoding channel DC2.

As shown in FIG. 11, the decoder 400 performing decoding through the decoding channels DC1 and DC2 may operate in the time sharing mode. In this mode, the decoder uses a plurality of the shared buffers SB1 through SB3, thereby reducing memory usage compared to when different buffers are used for respective channels and preventing display tearing.

As described above, according to exemplary embodiments of the present inventive concept, a method of operating a decoder and a method of operating an application processor including the decoder efficiently reduce memory usage during decoding and prevent display tearing.

As is traditional in the field of the inventive concepts, embodiments are described, and illustrated in the drawings, in terms of functional blocks, units and/or modules. Those skilled in the art will appreciate that these blocks, units and/or modules (e.g., an image determination block, an encoding module and a decoding module) are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of decoding image data, comprising:
   operating a decoder including a decoding buffer and a decoding module, wherein the decoding module includes at least a first decoding channel and a second decoding channel;
   setting a non-shared memory region and a shared memory region in the decoding buffer, wherein the non-shared memory region includes a plurality of non-shared buffers and the shared memory region includes a plurality of shared buffers, wherein the non-shared buffers are accessible by an assigned decoding channel, and the shared buffers are accessible by all decoding channels;
   restoring a plurality of frames by decoding a bitstream using the first and second decoding channels, wherein the bitstream includes a first section and a second section, wherein the first section of the bitstream is decoded by the first decoding channel, and the second section of the bitstream is decoded by the second decoding channel;
   determining a type of each of the frames; and
   writing each frame to one of the non-shared memory region or the shared memory region based on the type of each frame, wherein an I-frame of the plurality of frames is written to a first non-shared buffer of the plurality of non-shared buffers through the first decoding channel, and the I-frame is written to a second non-shared buffer of the plurality of non-shared buffers through the second decoding channel, wherein a first B-frame of the plurality of frames restored by using the first decoding channel is written to a first shared buffer of the plurality of shared buffers in the shared memory region at a first period, wherein a display interface reads the first B-frame from the first shared buffer through the first decoding channel at a second period, wherein, at the second period, the first B-frame is written to a second shared buffer through the second decoding channel, and, at substantially the same time, the display interface reads the first B-frame from the second shared buffer, and a second B-frame of the plurality of frames restored by using the second decoding channel is written to the first shared buffer in the shared memory region.

2. The method of claim 1, wherein the determining the type of each of the frames and writing each frame to one of the non-shared memory region and the shared memory region comprises:
   writing the frame to the non-shared memory region when the frame is either of an I-frame and a P-frame.

3. The method of claim 2, wherein when the frame is a B-frame, writing the frame to the shared memory region comprises:
   waiting for a read completion signal to be received from the display interface; and
   writing the frame to the shared memory region when the read completion signal is received.

4. The method of claim 2, wherein the determining the type of the frame comprises determining the type of the frame based on an image type assignment signal received from an encoder.

5. The method of claim 1, wherein the shared buffers are larger than the non-shared buffers.

6. The method of claim 1, wherein the decoder sequentially restores the frames assigned to each of the decoding channels in a time sharing manner.

7. The method of claim 1, wherein the decoding module performs decoding using the first and second decoding channels based on a plurality of standards comprising a moving picture experts group (MPEG)-2 standard and an MPEG-4 standard, wherein the first decoding channel corresponds to one of the plurality of standards and the second decoding channel corresponds to another of the plurality of standards.

8. A method of operating an application processor, the method comprising:
   setting each of unit buffers comprised in a decoding buffer as either of a non-shared buffer and a shared buffer;
   receiving a bitstream;
   restoring a plurality of frames by decoding the bitstream using a first decoding channel and a second decoding channel, wherein the bitstream includes a first section and a second section, wherein the first section of the bitstream is decoded by the first decoding channel, and the second section of the bitstream is decoded by the second decoding channel;

determining a type of each of the frames; and writing each frame to one of a plurality of non-shared buffers and a plurality of shared buffers based on the type of each frame, wherein the non-shared buffers are not shared between the first and second decoding channels and the shared buffers are shared between the first and second decoding channels, wherein an I-frame of the plurality of frames is written to a first non-shared buffer of the plurality of non-shared buffers through the first decoding channel, and the I-frame is written to a second non-shared buffer of the plurality of non-shared buffers through the second decoding channel, wherein a first B-frame of the plurality of frames restored by using the first decoding channel is written to a first shared buffer of the plurality of shared buffers at a first period, wherein a display interface reads the first B-frame from the first shared buffer through the first decoding channel at a second period, wherein, at the second period, the first B-frame is written to a second shared buffer through the second decoding channel, and, at substantially the same time, the display interface reads the first B-frame from the second shared buffer, and a second B-frame of the plurality of frames restored by using the second decoding channel is written to the first shared buffer.

9. The method of claim 8, wherein the determining the type of each of the frames and writing each frame to one of the non-shared buffers and the shared buffers comprises:

the writing the frame to an empty one of the non-shared buffers when the frame is either of an I-frame and a P-frame; and writing the frame to one of the shared buffers when the frame is a B-frame.

10. The method of claim 9, wherein the writing the frame to one of the shared buffers comprises:

determining whether there is an empty shared buffer among the shared buffers;

writing the frame to the empty shared buffer when there is the empty shared buffer; and overwriting a shared buffer, which has no access of the display interface among the shared buffers, with the frame when there is no empty shared buffer.

11. The method of claim 9, wherein the determining the type of the frame comprises determining the type of the frame based on an image type assignment signal received from an encoder.

12. The method of claim 8, wherein the decoder sequentially restores the frames sequentially assigned to each of the decoding channels in a time sharing mode.

13. A method of decoding image data, comprising:

operating a decoder including a decoding buffer and a decoding module, wherein the decoding module includes at least a first decoding channel and a second decoding channel;

setting a non-shared memory region and a shared memory region in the decoding buffer, wherein the non-shared memory region includes a plurality of non-shared buffers and the shared memory region includes a plurality of shared buffers;

restoring a plurality of frames by decoding a bitstream, wherein the bitstream includes a first section and a second section, wherein the first section of the bitstream is decoded by the first decoding channel, and the second section of the bitstream is decoded by the second decoding channel;

determining a type of each of the frames; and writing each frame to one of the non-shared buffers or shared buffers based on type of each frame through the first decoding channel or the second decoding channel, wherein the non-shared buffers are accessible by an assigned decoding channel, and the shared buffers are accessible by all decoding channels, wherein a first B-frame of the plurality of frames is written to a first shared buffer of the plurality of shared buffers through the first decoding channel at a first period, wherein a display interface reads the first B-frame from the first shared buffer through the first decoding channel at a second period, and at the second period, the first B-frame of the plurality of frames is written to a second shared buffer through the second decoding channel, and at substantially the same time, the display interface reads the first B-frame from the second shared buffer.

14. The method of claim 13, wherein each frame written to a shared buffer through a decoding channel is read at substantially a same time by thea display interface.

15. The method of claim 14, wherein the determining the type of each of the frames and writing each frame to one of the non-shared buffers or the shared buffers comprises:

writing the frame to the non-shared buffers when the frame is either of an I-frame and a P-frame.

16. The method of claim 14, wherein the determining the type of the frame comprises determining the type of the frame based on an image type assignment signal received from an encoder.

17. The method of claim 13, wherein restoring a plurality of frames by decoding a bitstream includes performing an inverse operation.

* * * * *